(No Model.)
J. GUEDEL.
SAW.
No. 599,329. Patented Feb. 22, 1898.
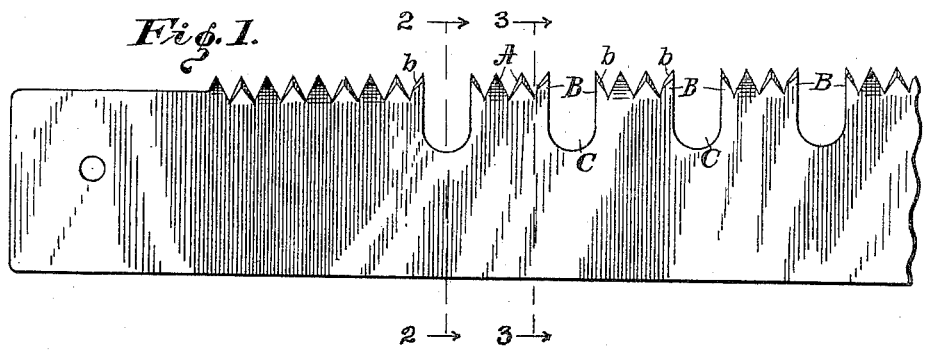
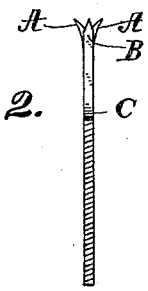
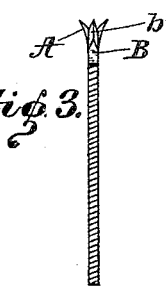
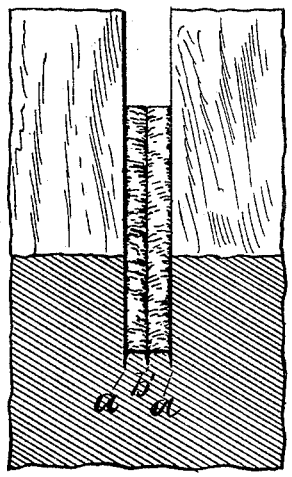
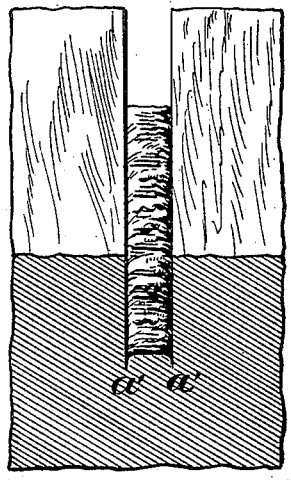
Witnesses
Carl Schlegel
L. A. Minturn
Inventor
John Guedel,
By Joseph A. Minturn
Attorney.

UNITED STATES PATENT OFFICE.

JOHN GUEDEL, OF INDIANAPOLIS, INDIANA.

SAW.

SPECIFICATION forming part of Letters Patent No. 599,329, dated February 22, 1898.

Application filed August 25, 1897. Serial No. 649,413. (No model.)

*To all whom it may concern:*

Be it known that I, JOHN GUEDEL, a citizen of the United States, residing at Indianapolis, in the county of Marion and State of Indiana, have invented certain new and useful Improvements in Saws, of which the following is a specification.

The objects of this invention are, first, to make a rake-tooth saw which can be filed without a gage to determine the proportionate length of the teeth and which will saw without "jumping" should some of the teeth happen to be of unequal length; second, to provide a saw in which the rake-teeth will remove the sawdust as deep as the cutting-teeth are cutting, thereby lessening the friction on the cutting-teeth; third, to provide a saw which will cut longitudinally and centrally of the kerf, thereby making the sawdust only half as long as the width of the kerf and consequently easier to break off and remove than if it extended integrally across the kerf; fourth, to group the teeth together in a manner to permit of connected bases of the teeth of each group to obviate the necessity of special "gumming" and to provide a broad and stiff section of the blade, which will keep the teeth from springing in the kerf and permit a deeper dust-space between the groups than usual, thereby enabling the saw to be used longer without recutting; and the object also is to provide a saw which will give good satisfaction for ripping or cross-cutting in either hard or soft wood.

I accomplish the objects of the invention by the mechanism illustrated in the accompanying drawings, in which—

Figure 1 is a side elevation of a portion of a saw-blade provided with teeth embodying my improvements; Fig. 2, a transverse section on the line 2 2 of Fig. 1; Fig. 3, a transverse section on the line 3 3 of Fig. 1; Fig. 4, a perspective view of a block of wood with a saw-kerf made by my improved saw; and Fig. 5, a perspective view of a block having a kerf made by a saw with a square-pointed rake-tooth, as commonly employed.

Similar letters of reference indicate like parts throughout the several views of the drawings.

A are the cutting-teeth, which are arranged in pairs throughout the length of the saw-blade at suitable regular intervals to within a short distance of the ends, where the cutting-teeth occur in a continuous series not broken up into pairs. These cutting-teeth are triangular in shape, and each alternate tooth has its edges sharpened on opposite sides from the tooth adjacent to it and are swaged or set in the manner as shown in Figs. 2 and 3.

B are rake-teeth, also arranged in pairs between each pair of cutting-teeth A. The adjacent edges of the rake-teeth are perfectly straight and at right angles to the blade and are separated by the spaces C, which are provided to receive the accumulation of sawdust cleaned out of the kerf by the rake-teeth. These spaces are approximately twice the width of the space from point to point of the cutting-teeth. The side of the rake-tooth next to the cutting-tooth, which is called the "rear" side of the tooth, is curved and inclined, as shown, when the saw is first made and is beveled or sharpened on opposite sides to form the edge *b*, which also gives the tooth a triangular point. The bevel, to save unnecessary labor, is carried only part way down the tooth at the first filing; but as the saw is filed in sharpening it the bevel is carried to the base of the tooth, and thereafter the inclined side of the tooth is straight from point to base. As the teeth in each group of four teeth meet at their bases, a stiff section of blade is provided which keeps the teeth from springing, and the metal between the teeth can be removed with the file at each filing, which will obviate the necessity of gumming. The rake-teeth are not swaged or set and are of the same length as the cutting-teeth. Therefore a filer can joint the saw down until his file touches every tooth, after which he can file the teeth up to a point. A gage to get the rake-teeth lower than the cutting-teeth is not necessary, and should the filer get some of the rake-teeth longer than the others or some of the cutting-teeth shorter than the average the saw will not "jump" when used, because the rake-tooth going rearward will cut in the center of the kerf ahead of the rake-tooth going forward, which will keep the latter from wedging tight into the sawdust at the bottom of the kerf.

As the cutting-teeth and rake-teeth are all approximately the same in length, they will work together, the rake-teeth clearing out the dust as deep as the wood is cut by the cutting-teeth, thereby taking the friction off of the cutting-teeth and making the saw run lighter.

Referring to Figs. 4 and 5, $a\ a$ of Fig. 4 represent the cuts made by the cutting-teeth A A, and $b'$ is the cut made by the rake-teeth midway between the side cuts $a\ a$. In Fig. 5, $a'\ a'$ are the cuts made by the cutting-teeth and show the kerf made by the saws now in common use, in which no center cut is made, the whole function of the rake-teeth being to rake the sawdust out which has been cut loose by the cutting-teeth going forward and cut the center when the tooth is going rearward.

In practice the rear side $b$ of the rake-tooth of my saw is cutting in the center of the kerf, which makes the sawdust only half as long as it would be without this center cut and makes it, of course, easier to break out and to remove. As the operation of sawing continues the saw sinks deeper into the wood, each tooth going a little lower down than the one preceding it, and the rake-tooth which is going forward—that is, in the direction of its straight side—and which does the clearing will go a little deeper than the rake-tooth preceding it, which by going rearward, or in the direction of its sharpened edge, has done the center cutting. The rake-tooth which is clearing out the sawdust therefore will remove it clear across the cut, and by so doing will keep the saw from binding in the kerf.

I am aware that rake-teeth have been made for saws having one side straight and approximately at right angles to the longitudinal dimensions of the saw-blade and sharpened near the point to a center cutting edge and having a second side inclined to the first and also sharpened to a center cutting edge. I am also aware that rake-teeth have been made having one side straight, square, and approximately at right angles to the longitudinal dimensions of the saw-blade and having a second side inclined to the first at an angle of more than forty-five degrees therewith and having the metal at the base between it and the adjacent tooth "gummed" or cut away and the remaining portion of the inclined side sharpened to a center cutting edge. I am also aware that saws have been made in which the teeth were made in groups of four, comprising two outside square pointed oppositely-acting rake-teeth and two oppositely sharpened and set cutting-teeth placed intermediate of the rake-teeth, said teeth having the metal gummed or cut out between them, and such above-mentioned constructions I do not claim as my invention; but What I do claim as new, and wish to secure by Letters Patent of the United States, is—

In a saw, the combination, with a pair of oppositely sharpened and swaged cutting-teeth, of a pair of combined rake and cutting teeth which are not swaged, between which the swaged cutting-teeth are located, said combined rake and cutting teeth having straight, square, outer sides approximately at right angles to the longitudinal dimensions of the saw-blade, for raking, and having inner sides, or sides next to the cutting-teeth, approximately straight from point to base of each tooth, but inclined to said outer side at an angle less than forty-five degrees, the inclined side being sharpened to form a central cutting edge and triangular point, the points of all of said teeth terminating in the same line, substantially as described.

In witness whereof I have hereunto set my hand and seal, at Indianapolis, Indiana, this 19th day of August, A. D. 1897.

JOHN GUEDEL. [L. S.]

Witnesses:
J. A. MINTURN,
CARL SCHLEGEL.